United States Patent
Choi et al.

(10) Patent No.: US 7,321,542 B2
(45) Date of Patent: Jan. 22, 2008

(54) BEAM SHAPING PRISM AND OPTICAL PICKUP EMPLOYING THE SAME

(75) Inventors: Jong-chul Choi, Suwon-si (KR); Tae-kyung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 517 days.

(21) Appl. No.: 11/033,625

(22) Filed: Jan. 13, 2005

(65) Prior Publication Data

US 2005/0152051 A1   Jul. 14, 2005

(30) Foreign Application Priority Data

Jan. 13, 2004   (KR) .................. 10-2004-0002257

(51) Int. Cl.
*G11B 7/00* (2006.01)
*G02B 5/04* (2006.01)

(52) U.S. Cl. .................. 369/112.28; 359/837
(58) Field of Classification Search ............. 359/837
See application file for complete search history.

(56) References Cited

U.S. PATENT DOCUMENTS

| | | | | |
|---|---|---|---|---|
| 4,759,616 A | * | 7/1988 | Marchant | 359/669 |
| 4,804,835 A | * | 2/1989 | Ando | 369/112.28 |
| 5,155,633 A | * | 10/1992 | Grove et al. | 359/834 |
| 5,220,553 A | * | 6/1993 | Ando et al. | 369/112.21 |
| 5,311,496 A | * | 5/1994 | Whitehead | 369/112.21 |
| 5,544,144 A | * | 8/1996 | Takishima et al. | 369/112.2 |
| 5,596,456 A | * | 1/1997 | Luecke | 359/831 |
| 5,751,681 A | * | 5/1998 | Matsui | 369/44.23 |
| 6,341,106 B1 | * | 1/2002 | Nakanishi et al. | 369/44.28 |
| 6,404,715 B1 | * | 6/2002 | Takishima et al. | 369/53.26 |
| 6,934,239 B2 | * | 8/2005 | Takeuchi | 369/112.01 |
| 2001/0024417 A1 | * | 9/2001 | Yanagawa et al. | 369/112.19 |
| 2005/0052968 A1 | * | 3/2005 | Lee et al. | 369/44.37 |

OTHER PUBLICATIONS

Hecht, Eugene, "OPTICS," Addison-Wesley Publishing Company, Second Edition, pp. 98 and 103, no date.

* cited by examiner

*Primary Examiner*—Paul W. Huber
(74) *Attorney, Agent, or Firm*—Stein, McEwen & Bui, LLP

(57) ABSTRACT

A beam shaping prism used in an optical pickup, the beam shaping prism includes a first prism having an incident surface and a second prism having an inclined surface. Since a beam entering the beam shaping prism makes right angles with a beam emerging therefrom, it is easy to optically arrange and assemble elements.

41 Claims, 11 Drawing Sheets

BEAM SHAPING PRISM AND OPTICAL PICKUP EMPLOYING THE SAME

CROSS-REFERENCE TO RELATED APPLICATIONS

This application claims the priority of Korean Patent Application No. 10-2004-0002257, filed on Jan. 13, 2004 in the Korean Intellectual Property Office, the disclosure of which is incorporated herein in its entirety by reference.

BACKGROUND OF THE INVENTION

1. Field of the Invention

The present invention relates to a beam shaping prism designed to create an orthogonal optical path and an optical pickup employing the same.

2. Description of the Related Art

As interest in mobile recording devices increases, demands for optical recording applications using low-priced media increase and optical pickups for mobile applications are being actively developed.

An optical pickup for mobile applications requires high output power of a laser diode (LD) used as a light source for recording, which leads to high power consumption and heating value.

To overcome these problems, one solution is to increase the efficiency of light utilization by shaping a laser beam with a beam shaping prism, thereby realizing a system for recording with lower output power requirements. A beam shaping prism is commonly used in an optical pickup for recording due to the profile of an output beam from a LD.

FIG. 1 is a schematic diagram of a typical LD that emits a laser beam from a side. Referring to FIG. 1. a laser beam having an elliptical cross-section is emitted from an activation layer 3 of a LD 1. The elliptical beam profile is due to a difference between thickness (vertical dimension) and width (horizontal dimension) of the activation layer 3.

Due to the geometry and structure of the activation layer 3, vertical and horizontal diffraction angles differ so angles $\theta\|$ and $\theta\perp$, which the beam emitted from the LD 1 diverges in horizontal and vertical directions, respectively, differ from each other. Thus, the beam diverging in the horizontal direction appears to have been emitted from a location that is a distance $\Delta Z$ behind a location from which the beam diverges in vertical direction. The distance difference $\Delta Z$ between starting points where the beam diverges in the vertical and horizontal directions is called an "astigmatic difference".

In this case, the main polarization direction of a beam emitted by the LD 1 is a minor axis (i.e., horizontal) direction of the beam. Thus, due to the astigmatic difference, the LD 1 commonly used as a light source in an optical pickup emits an elliptical beam polarized in the minor axis direction.

In contrast to the LD 1 emitting an elliptical beam, an objective lens with a circular aperture needs a circular beam in order to increase the efficiency of light utilization. Thus, to achieve the same purpose, an optical pickup for recording commonly uses a beam shaping prism to convert an elliptical beam emitted by the LD 1 into a circular beam.

FIG. 2 shows an example of a conventional optical pickup. Referring to FIG. 2, the conventional optical pickup includes a LD 11, a beam shaping prism 20 that shapes an elliptical beam emitted by the LD 11 into a circular beam and changes the propagation path of the beam, an objective lens 19 that focuses an incident beam to a spot on an optical disc 10, and a photodetector 29 that receives a beam reflected from the optical disc 10.

A collimating lens 13 collimates the beam emitted from the laser diode 11 to a parallel beam that then passes through a grating 15 and is incident onto the beam shaping prism 20. The beam shaping prism 20 is comprised of first and second prisms 21 and 23 that shape the incident elliptical beam into a circular beam and a third prism 25 that reflects a beam reflected off a mirror surface between the first and second prisms 21 and 23.

The beam passing through the first and second prisms 21 and 23 is shaped into a circular beam that is then reflected from a reflecting mirror 17 into the objective lens 19. The beam is focused onto the optical disc 10 by the objective lens 19. The beam reflected from the optical disc passes through the objective lens 19 and the reflecting mirror 17, is incident onto the second prism 23, and is reflected from the mirror surface between the first and second prisms 21 and 23 into the third prism 25. The beam incident on the third prism 25 is internally reflected from an inclined surface toward the photodetector 29, is changed into a convergent beam through a collimating lens 27, and is focused onto the photodetector 29 through a sensing lens 28.

In the conventional optical pickup, an optical axis of a beam emitted from the LD 11 onto the beam shaping prism 20 is not perpendicular to an optical axis of a beam emerging from the beam shaping prism 20 toward the objective lens 19. Thus, optical elements are arranged at designated angles to each other.

Fixing components at designated angles to each other deteriorates precision in manufacturing a base on which all the optical pickup system elements except an objective lens are arranged and assembled, thus causing difficulties in precisely assembling the elements. That is, it is difficult to control tolerances during the manufacture of the base and assembly and alignment of the elements, as opposed to when the two optical axes are orthogonal to or coincident with each other.

SUMMARY OF THE INVENTION

The present invention provides a beam shaping prism designed such that a beam emerging from the beam shaping prism is orthogonal to a beam entering the beam shaping prism and an optical pickup with the beam shaping prism and which is easy to control tolerances during the manufacture of a base and the assembly and alignment of optical elements.

Additional aspects and/or advantages of the invention will be set forth in part in the description which follows and, in part, will be obvious from the description, or may be learned by practice of the invention.

According to an aspect of the present invention, there is provided a beam shaping prism including a first prism having an incident surface and a second prism having an inclined surface. When an angle that the incident surface makes with an incident beam having an incident angle of $\theta 1$ is $\alpha 1$, and an angle that the inclined surface makes with a beam that passes from the first prism into the second prism and is reflected from the inclined surface is $\alpha 2$, the beam shaping prism satisfies Equation (1) and allows the beam to emerge perpendicularly to the incident beam:

$$\theta 1 = \text{incident angle}$$

$$\theta 2 = \sin^{-1}\left(\frac{\sin\theta 1}{n1}\right)$$

$$\theta 3 = \theta 1 - \theta 2$$

-continued $$\theta 4 = \sin^{-1}\left(\frac{n1 \times \sin\theta 3}{n2}\right)$$

$$\theta 5 = \frac{90° + \theta 4}{2}$$

$$\alpha 1 = 90° - \theta 1$$

$$\alpha 2 = \theta 5 - \theta 4 = \frac{90° - \theta 4}{2}$$

where n1 and n2 are refractive indices of the first and second prisms, respectively, $\theta 2$ is a refraction angle of a beam that is refracted through the incident surface of the first prism, $\theta 3$ is an incident angle of a beam that passes from the first prism into the second prism, $\theta 4$ is a refraction angle of a beam refracted through the first prism into the second prism, and $\theta 5$ is an angle that a beam traveling through the first prism is incident on the inclined surface of the second prism.

In an aspect of the present invention, a beam shaping ratio M that is a ratio of a width of the exit beam to a width of the incident beam is defined by Equation (2):

$$M = \frac{\cos\theta 2 \cos\theta 4}{\cos\theta 1 \cos\theta 3}$$

In an aspect of the present invention, first and second prisms are made from media having refractive indices and dispersion coefficients that satisfy Equation (3) in order to compensate for chromatic aberration:

$$\frac{n1}{n2} \times \sin(\theta 1 - \theta 2) = \frac{n1'}{n2'} \times \sin(\theta 1 - \theta 2')$$

where n1', n2', and $\theta 2'$ denote refractive indices and angle corresponding to n1, n2, and $\theta 2$, respectively, when a wavelength changes.

In an aspect of the present invention, the incident surface is coated to increase the transmittance of an S-polarized beam. The beam shaping prism further includes a half wave plate that is disposed between the first and second prisms and converts the polarization of the incident beam into orthogonal polarization. The beam shaping prism further includes a third prism that is disposed adjacent to the inclined surface of the second prism and thus the beam shaping prism acts as a polarization beam splitter.

According to another aspect of the present invention, there is provided an optical pickup including a beam shaping prism and which shapes a beam emitted by a light source, focuses the shaped beam onto an optical information storage medium by an objective lens, and receives the beam reflected from the optical information storage medium by a photodetector, wherein a beam shaping prism includes a first prism having an incident surface and a second prism having a surface inclined to an interface with the first prism. When an angle that the incident surface makes with an incident beam having an incident angle of $\theta 1$ is $\alpha 1$, and an angle that the inclined surface makes with a beam that passes from the first prism into the second prism and is reflected from the inclined surface is $\alpha 2$, the beam shaping prism satisfies Equation (1) and allows the beam to emerge perpendicularly to the incident beam:

$$\theta 1 = \text{incident angle}$$

$$\theta 2 = \sin^{-1}\left(\frac{\sin\theta 1}{n1}\right)$$

$$\theta 3 = \theta 1 - \theta 2$$

$$\theta 4 = \sin^{-1}\left(\frac{n1 \times \sin\theta 3}{n2}\right)$$

$$\theta 5 = \frac{90° + \theta 4}{2}$$

$$\alpha 1 = 90° - \theta 1$$

$$\alpha 2 = \theta 5 - \theta 4 = \frac{90° - \theta 4}{2}$$

where n1 and n2 are refractive indices of the first and second prisms, respectively, $\theta 2$ is a refraction angle of a beam that is refracted through the incident surface of the first prism, $\theta 3$ is an incident angle of a beam that passes from the first prism into the second prism, $\theta 4$ is a refraction angle of a beam refracted through the first prism into the second prism, and $\theta 5$ is an angle that a beam traveling through the first prism is incident on the inclined surface of the second prism.

In an aspect of the present invention, the optical pickup further includes a quarter wave plate that is disposed between the beam shaping prism and the objective lens and changes the polarization of a beam.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
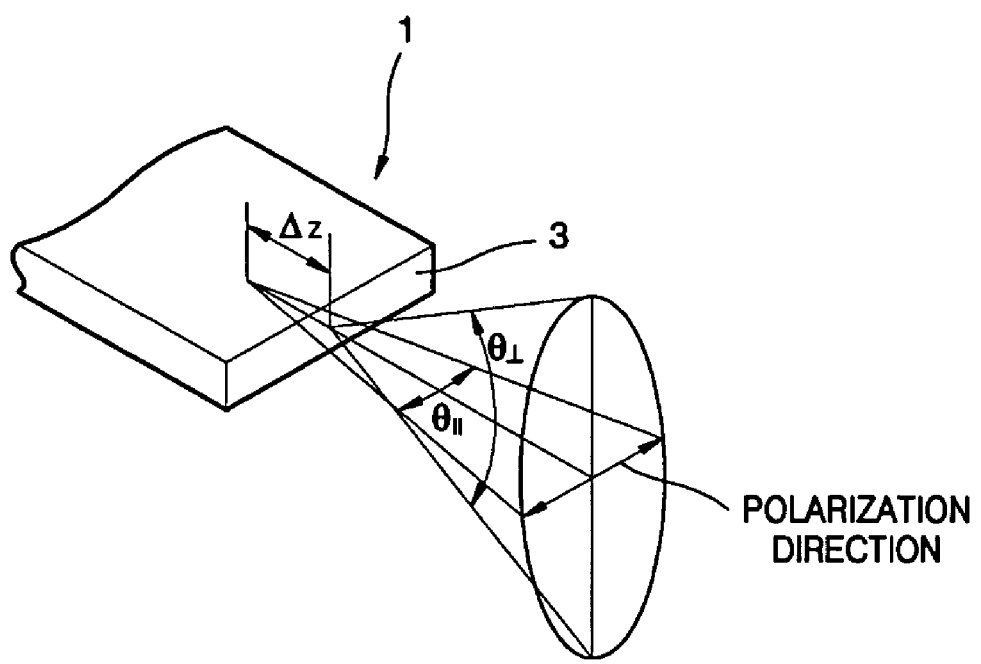
FIG. 1 is a schematic diagram of a conventional laser diode emitting a laser beam from a side.
Figure 2:
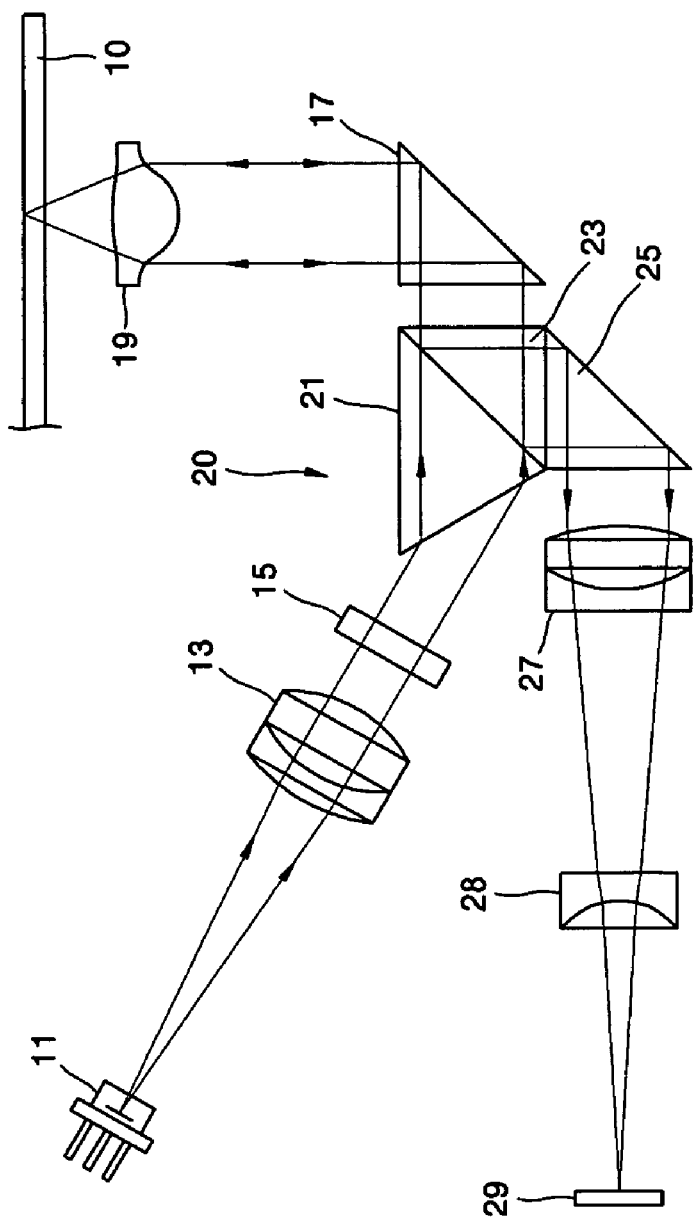
FIG. 2 shows an example of a conventional optical pickup.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
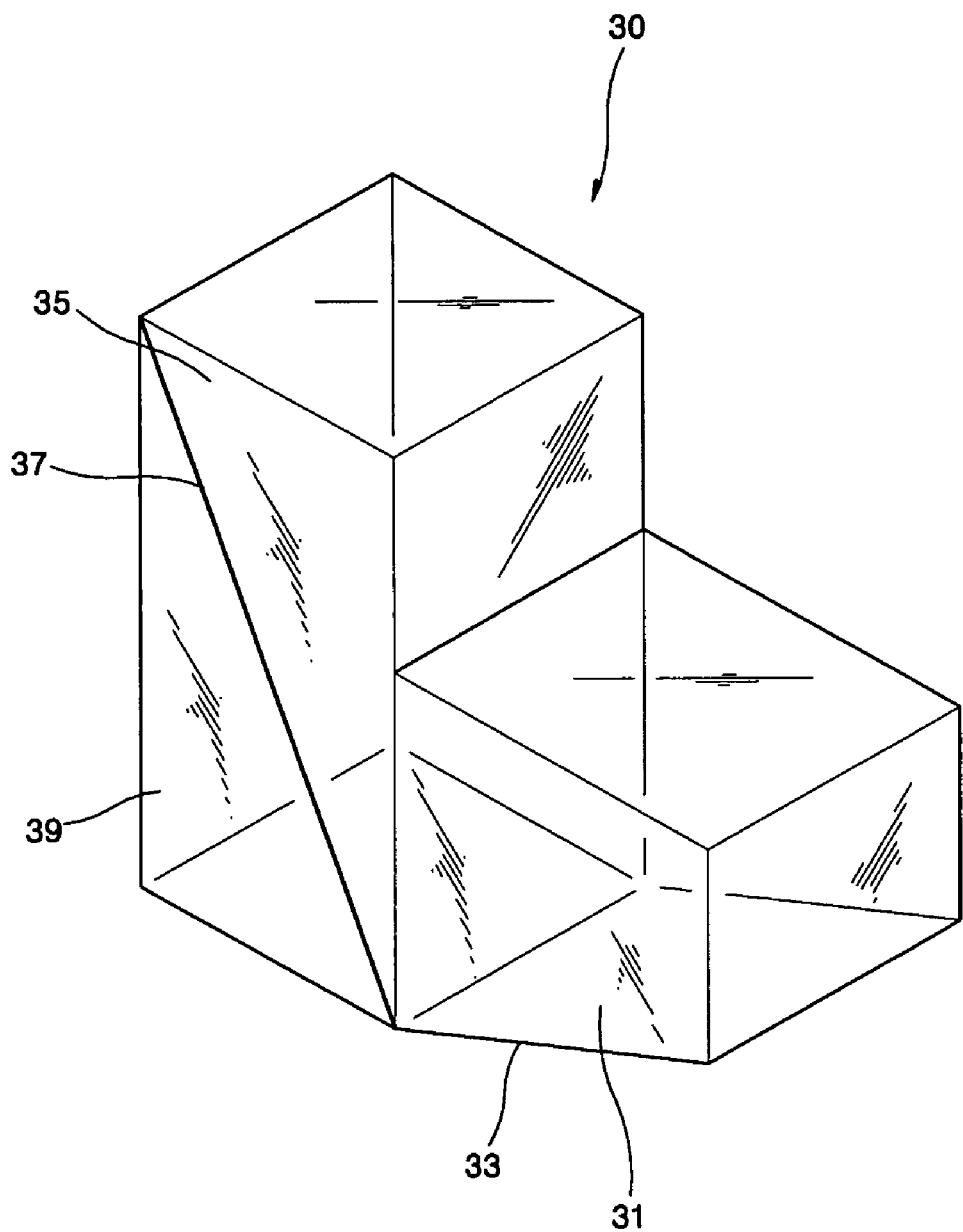
FIG. 3 is a schematic perspective view of a beam shaping prism according to an embodiment of the present invention.

Referring to FIG. 3, a beam shaping prism 30 includes a first prism 31 having an incident surface 33 and a second prism 35 having an inclined surface 37 with respect to an interface with the first prism 31. The first and second prisms 31 and 35 shape an incident elliptical beam into a circular beam and allow an exit beam to be perpendicular to the incident beam. The first and second prisms 31 and 35 are constructed of media having different dispersion coefficients and refractive indices in order to compensate for chromatic aberration. An angle $\alpha 2$ that the inclined surface 37 of the second prism 35 makes with the direction of the exit beam is determined such that an optical path of the incident beam is orthogonal to that of the exit beam.

Figure 4:
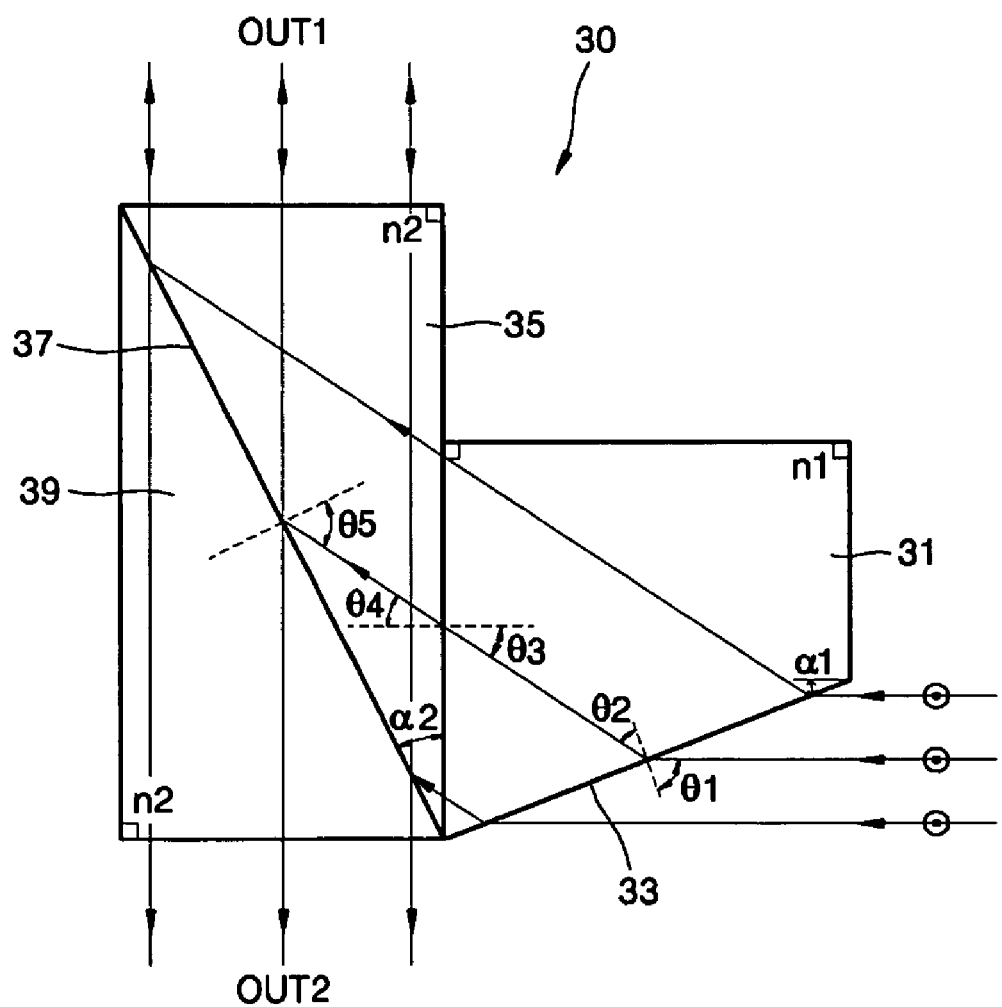
FIG. 4 is a side view showing the refraction and reflection of a beam in the beam shaping prism of FIG. 3.

Referring to FIG. 4, where an angle that the incident surface 33 of the first prism 31 makes with an incident beam having an incident angle of $\theta 1$ is $\alpha 1$ and an angle that the inclined surface 37 of the second prism 35 makes with an exit beam oriented perpendicularly to the incident beam is $\alpha 2$, the beam shaping prism 30 preferably satisfies requirements of Equation (1) in order to allow the beam to emerge perpendicularly to the incident beam:

$$\theta 1 = \text{incident angle} \quad (1)$$
$$\theta 2 = \sin^{-1}\left(\frac{\sin\theta 1}{n1}\right)$$
$$\theta 3 = \theta 1 - \theta 2$$
$$\theta 4 = \sin^{-1}\left(\frac{n1 \times \sin\theta 3}{n2}\right)$$
$$\theta 5 = \frac{90° + \theta 4}{2}$$
$$\alpha 1 = 90° - \theta 1$$
$$\alpha 2 = \theta 5 - \theta 4 = \frac{90° - \theta 4}{2}$$

In Equation (1), $\theta 1$ is an incident angle and n1 and n2 are refractive indices of the first and second prisms 31 and 35, respectively. $\theta 2$ is a refraction angle of a beam that is refracted through the incident surface 33 of the first prism 31 and $\theta 3$ is an incident angle of a beam that passes from the first prism 31 into the second prism 35. $\theta 4$ is a refraction angle of a beam refracted through the first prism 31 into the second prism 35, and $\theta 5$ is an angle that a beam traveling through the second prism 35 is incident on the inclined surface 37 of the second prism 35.

In this case, a beam shaping ratio is determined as follows. To explain the beam shaping ratio, FIG. 5 shows a modified example of the beam shaping prism 30 of FIG. 3.

Figure 5:
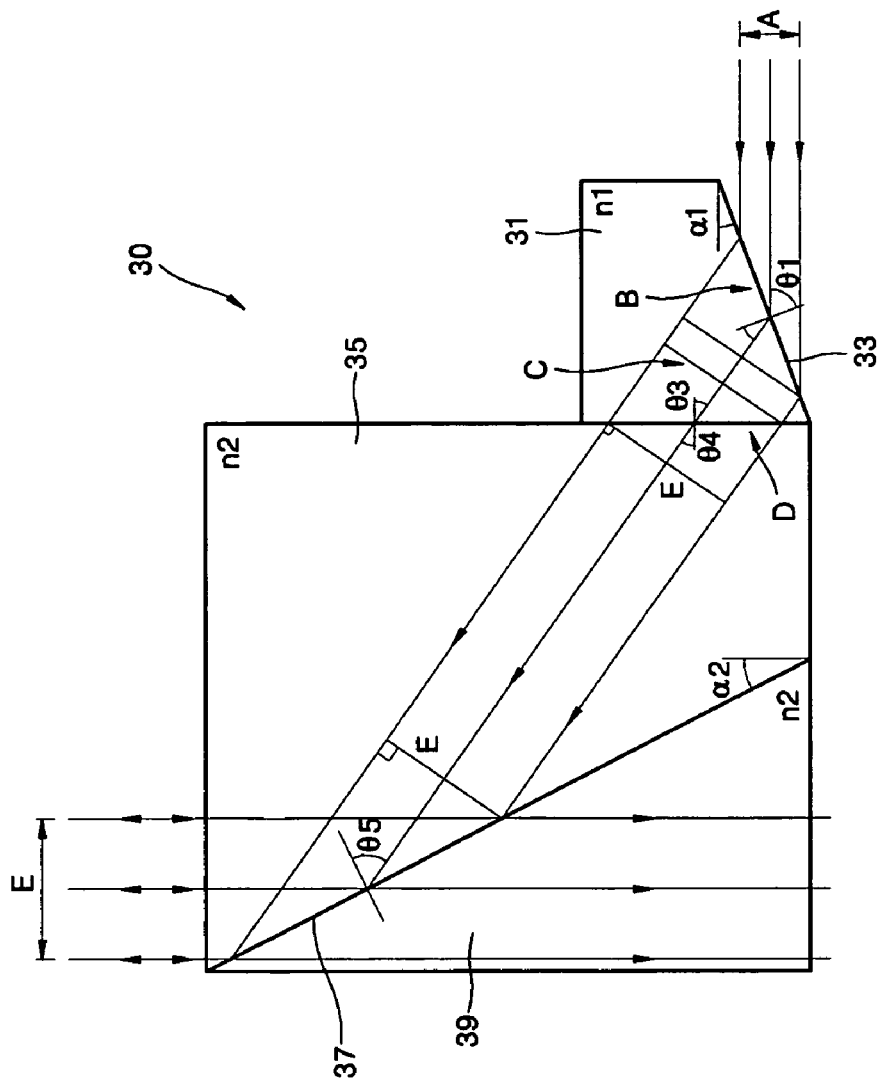
FIG. 5 is a diagram for explaining a beam shaping ratio in the beam shaping prism of FIG. 3.

Referring to FIG. 5, where a width of a beam incident on the first prism 31 is A, a width of a beam when it meets the incident surface 33 of the first prism 31 is B, a width of a beam refracted through the incident surface 33 of the first prism 31 into the first prism 31 is C, a width of a beam when it meets an interface between the first and second prisms 31 and 35 is D, and a width of a beam refracted at the interface into the second prism 35 is E, the widths B, C, D, and E are defined by Equation (2). In the beam-shaping prism 30 that satisfies Equation (1), the width E of the beam is the width of an exit beam subjected to shaping.

$$B = \frac{A}{\sin\alpha 1} \quad (2)$$
$$C = B\cos\theta 2 = \frac{A\cos\theta 2}{\sin\alpha 1}$$
$$D = \frac{C}{\cos\theta 3} = \frac{A\cos\theta 2}{\sin\alpha 1 \cos\theta 3}$$
$$E = D\cos\theta 4 = \frac{A\cos\theta 2 \cos\theta 4}{\sin\alpha 1 \cos\theta 3}$$

Thus, since a beam shaping ratio M refers to a ratio of a width E of an exit beam to a width A of an incident beam, the beam shaping ratio M is defined by Equation (3) using Equations (1) and (2):

$$M = \frac{E}{A} = \frac{\cos\theta 2 \cos\theta 4}{\sin\alpha 1 \cos\theta 3} = \frac{\cos\theta 2 \cos\theta 4}{\sin(90° - \theta 1)\cos\theta 3} = \frac{\cos\theta 2 \cos\theta 4}{\cos\theta 1 \cos\theta 3} \quad (3)$$

When the beam shaping prism 30 is constructed to satisfy the requirements of Equation (1), the incident beam is perpendicular to the exit beam. When the beam shaping prism 30 is used in an optical pickup, an optical path of the optical pickup can be constructed such that a path of the incident beam makes 90 degrees with a path of the exit beam. Furthermore, it is possible to change a width of the incident beam based on the beam shaping ratio M of Equation (3).

In this case, in the beam shaping prism 30, a width L1 of the first prism 31, a length L2 and a width L3 of the second prism 35, the angles $\alpha 1$ and $\alpha 2$ in the first and second prisms 31 and 35, and the beam shaping ratio M are determined as variables with respect to the incident angle $\theta 1$ and the refractive indices n1 and n2 of the first and second prisms 31 and 35. Thus, an elliptical beam entering the beam shaping prism 30 is shaped into a circular beam when leaving the beam shaping prism 30.

Figure 6A:
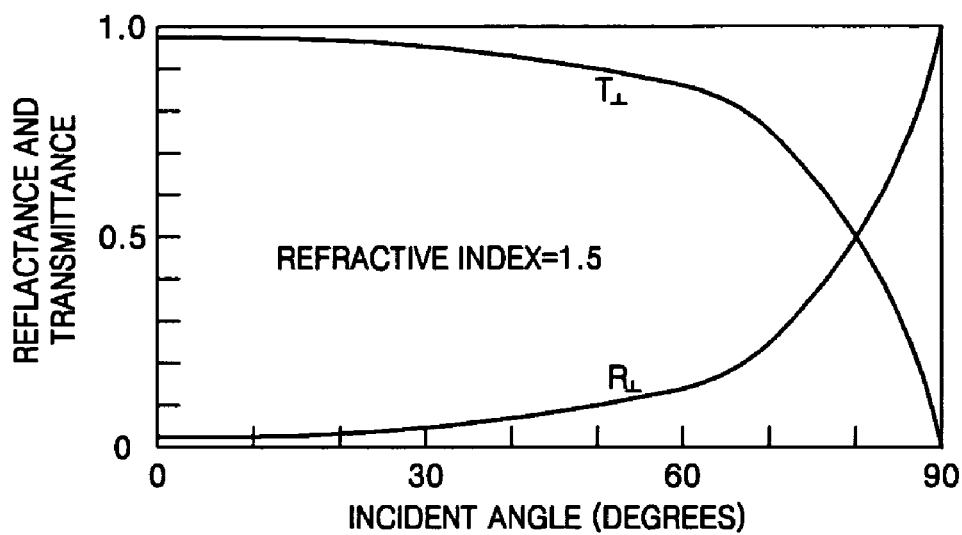
FIG. 6A illustrates changes in reflectance and transmittance with respect to an incident angle of a beam polarized orthogonally to the plane of incidence when the beam propagates from air to a predetermined optical medium having a higher refractive index than the air.
Figure 6B:
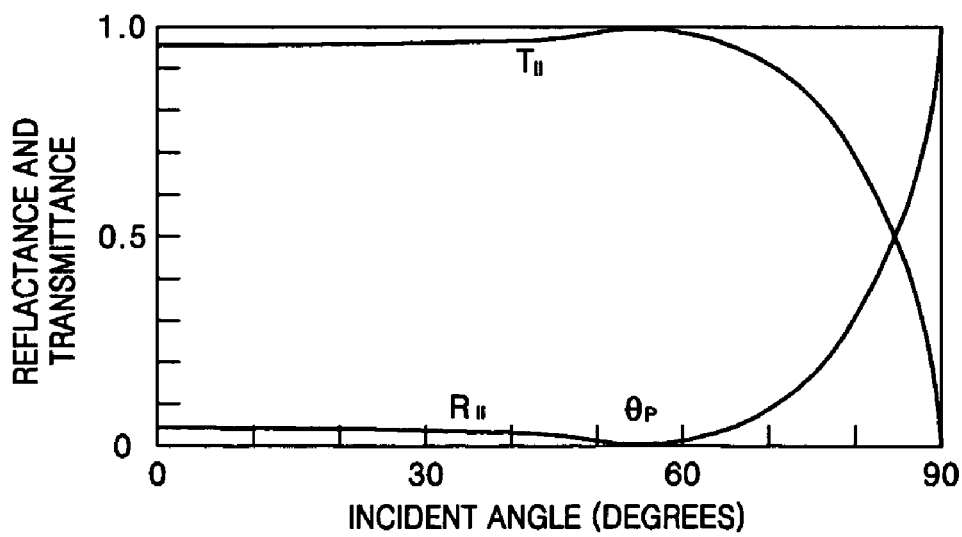
FIG. 6B illustrates changes in reflectance and transmittance with respect to an incident angle of a beam polarized parallel to the plane of incidence when the beam propagates from air to a predetermined optical medium having a higher refractive index than air.

As is evident by FIGS. 6A and 6B, when a beam passes from a medium having a low refractive index to a medium having a high refractive index, the transmittance of a P-polarized beam is higher than that of an S-polarized beam. That is, the reflectance of the P-polarized beam is lower than that of the S-polarized beam. This type of reflection occurring when the beam moves from the medium of a low refractive index to the medium of a high refractive index is called external reflection.

FIGS. 6A and 6B illustrate changes in reflectance and transmittance with respect to an incident angle when the beam propagates from air to a predetermined optical medium having a higher refractive index than air. In this case, refractive indices of the predetermined optical medium and air are 1.5 and 1, respectively. $T_\perp$ and $R_\perp$ denote transmittance and reflectance of a beam polarized perpendicularly to the plane of incidence, that is, an S-polarized beam, and $T_\parallel$ and $R_\parallel$ denote transmittance and reflectance of a beam polarized parallel to the plane of incidence, that is, a P-polarized beam. The graphs of FIGS. 6A and 6B are excerpted from OPTICS by Eugene Hecht, Second Edition, page 103, FIG. 4.29 (Addison-Wesley Publishing Company).

Meanwhile, in the case of internal reflection which occurs when a beam propagates from the medium of high refractive index to the medium of low refractive index, reflectance of an S-polarized beam is higher than that of a P-polarized beam. The difference in internal reflectance between the S- and P-polarized beams is described in the above-cited reference (page 98, FIG. 4.23). The reflectance is the square of an amplitude reflection coefficient.

A laser diode used as a light source in an optical pickup emits an elliptical beam, that is, an elliptical laser beam mainly linearly polarized in a minor axis direction. Beam shaping is usually performed in such a way as to shape the elliptical laser beam into a circular beam with a minor axis diameter equal to a major axis diameter by enlarging the minor axis diameter.

Thus, if there is no optical element to change the polarization of a beam emitted from the laser diode, or if the laser diode is not manufactured to emit a laser beam linearly polarized in a major axis direction, a beam having polarization parallel to the plane of incidence, that is, a P-polarized beam, may-be incident onto the beam shaping prism 30.

However, to increase the efficiency of light utilization, it is necessary to maximize the amount of light reflected from the inclined surface 37 of the second prism 35. To achieve this purpose, an S-polarized beam should be incident onto the second prism 35 since the reflectance of the S-polarized beam is higher than that of the P-polarized beam upon internal reflection.

Thus, when the beam shaping prism 30 is applied to an optical system designed such that the S-polarized beam enters the beam shaping prism 30, the incident surface 33 of the first prism 31 is preferably coated to increase the transmittance of the S-polarized beam.

Figure 7:
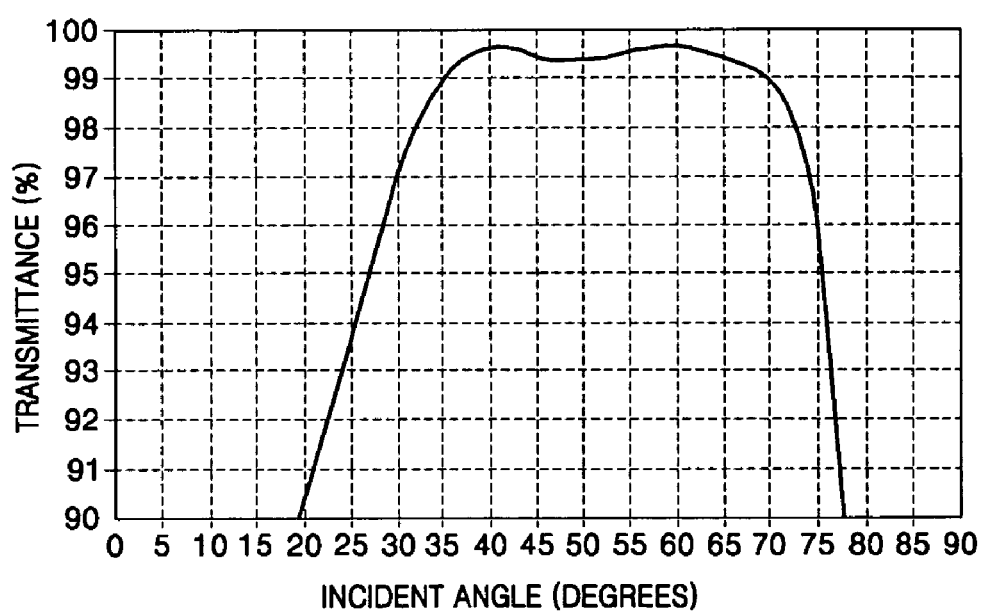
FIG. 7 is a graph illustrating transmittance of a beam when an incident surface of the beam shaping prism of FIG. 3 is coated.

The incident surface 33 is preferably coated to have a transmittance of 90% or more, further preferably, approximately 99% or more, at an incident angle between 35° and 70°. FIG. 7 is a graph illustrating changes in transmittance of a beam with respect to an incident angle in the range from 35° to 70° when an S-polarized beam with a wavelength of 405 nm and the incident surface 33 is coated to have a transmittance greater than approximately 99% or more. When the incident surface 33 is coated in this way, most of the incident S-polarized beam can be transmitted through the incident surface 33.

Here, to allow the S-polarized beam to enter the beam shaping prism 30, the laser diode may be designed to emit an elliptical beam polarized in a major axis direction, that is, an S-polarized beam. Another way of doing this is to include a separate optical element that is disposed on an exit surface of a typical laser diode and converts a P-polarized beam to an S-polarized beam or to include a half wave plate in front of the first prism 31 of the beam shaping prism 30 so that the S-polarized beam is incident onto the beam shaping prism 30 as will be described later in an optical pickup of FIG. 9.

Figure 8:
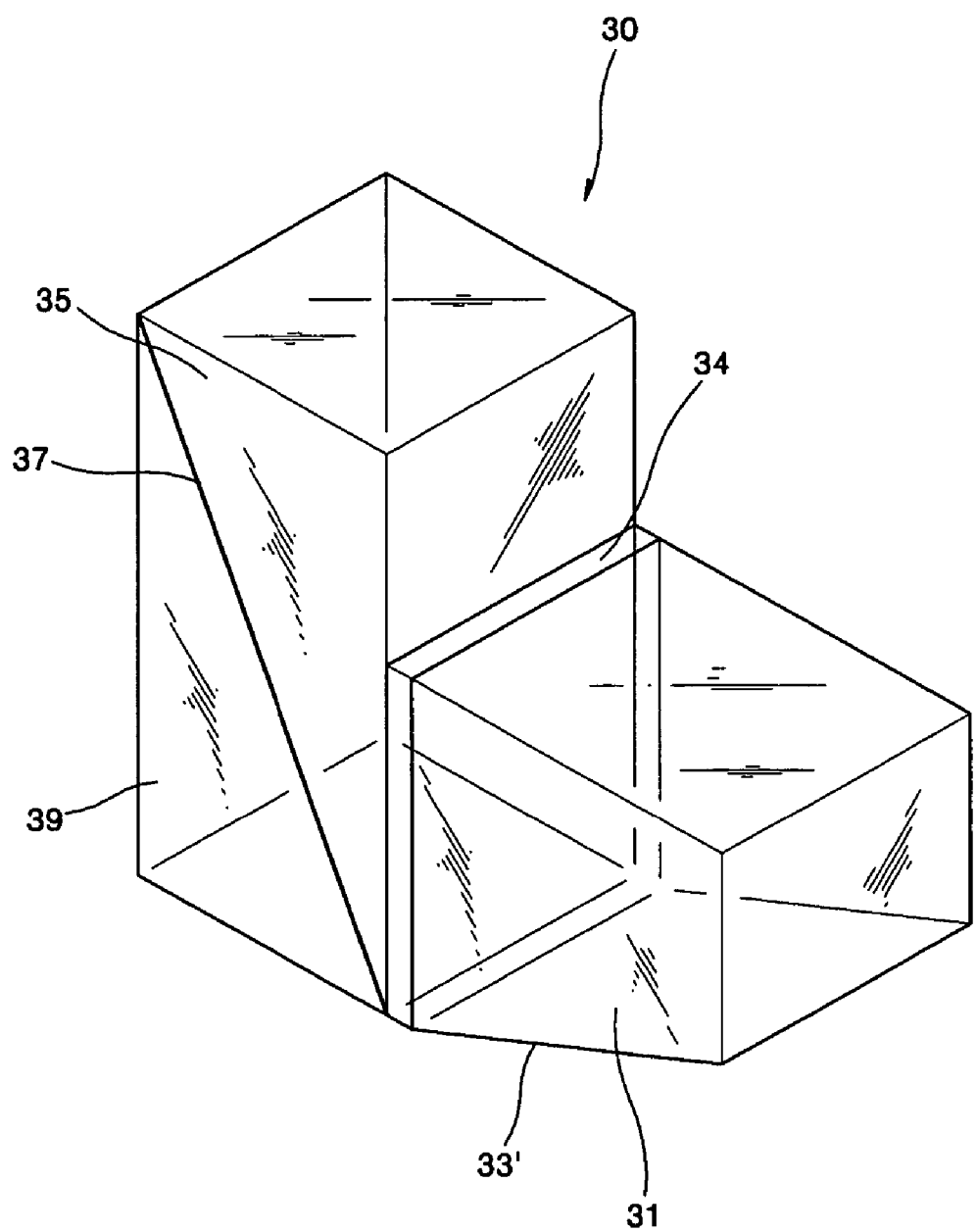
FIG. 8 is a schematic perspective view of a beam shaping prism according to another embodiment of the present invention.

Alternatively, when the beam shaping prism 30 is applied to an optical system, it may be designed to receive a P-polarized beam and further include a half wave plate 34 that is disposed between the first and second prisms 31 and 35 to convert the P-polarized beam to the S-polarized beam as shown in FIG. 8. In this case, since transmittance of the P-polarized beam is higher than that of the S-polarized beam, it is not necessary to coat an incident surface 33'. However, the incident surface 33' may be coated to further increase the transmittance of the P-polarized beam.

As described above, to allow the S-polarized beam to impinge on the inclined surface 37 of the second prism 35, the beam shaping prism 30 may be designed so that the S-polarized beam is incident onto the incident surface 33 of the first prism 31 and the incident surface 33 is coated to increase the transmittance of the S-polarized beam, or so that the P-polarized beam is incident onto the incident surface 33' of the first prism 31 and the half wave plate 34 is disposed between the first and second prisms 31 and 35 to convert the P-polarized beam to the S-polarized beam. Either way, it is possible to maximize the internal reflectance.

Thus, most of the light passing from the first prism 31 into the second prism 35 is reflected from the inclined surface 37 of the second prism 35 and then emerges perpendicularly to the beam incident onto the beam shaping prism 30. As described above, the beam shaping prism 30 is constructed such that a beam emerges at a right angle to the incident beam.

Accordingly, the beam shaping prism 30 can be applied to an optical system designed to allow the S-polarized beam to enter the beam shaping prism 30 by coating the incident surface 33 of the first prism 31 in such a way as to increase the transmittance of the S-polarized beam. The beam shaping prism 30 can also be applied to an optical system designed to allow the P-polarized beam to enter the beam shaping prism 30 further including the half wave plate 34 for converting the P-polarized beam to the S-polarized beam between the first and second prisms 31 and 35.

The beam shaping prism 30 may be preferably constructed to not only shape a beam but also compensate for chromatic aberration. To this end, the first and second prisms 31 and 35 are made from media having different dispersion coefficients and refractive indices.

When a beam has a wavelength that differs from that in Equation (1), Equation (4) defines the following requirements using the angles and refractive indices used in Equation (1) with a prime mark attached.

$$\theta 1 = \text{incident angle} \quad (4)$$
$$\theta 2' = \sin^{-1}\left(\frac{\sin\theta 1}{n1'}\right)$$
$$\theta 3' = \theta 1 - \theta 2'$$
$$\theta 4' = \sin^{-1}\left(\frac{n1' \times \sin\theta 3'}{n2'}\right)$$
$$\theta 5' = \frac{90° + \theta 4'}{2}$$
$$\alpha 1 = 90° - \theta 1$$
$$\alpha 2' = \theta 5' - \theta 4' = \frac{90° - \theta 4'}{2}$$

where θ2', θ3', θ4', θ5', n1', n2', α2 correspond to θ2, θ3, θ4, θ5, n1, n2, α in Equation (1), respectively.

Compensating for chromatic aberration refers to a beam that emerges from the beam shaping prism 30 remaining perpendicular to a beam entering it even when a wavelength varies, that is, θ5=θ5'. When θ5=θ5', θ4=θ4' as is evident by Equations (1) and (4). By using θ4 and θ4' in Equations (1) and (4), respectively, the relationship defined in Equation (5) can be obtained:

$$\sin^{-1}\left(\frac{n1 \times \sin\theta3}{n2}\right) = \sin^{-1}\left(\frac{n1' \times \sin\theta3'}{n2'}\right) \quad (5)$$

Furthermore, the relationship in Equation (6) is obtained from the relationship defined by Equation (5):

$$\frac{n1 \times \sin\theta3}{n2} = \frac{n1' \times \sin\theta3'}{n2'} \quad (6)$$

Substituting $\theta1-\theta2$ and $\theta1-\theta2'$ in Equations (1) and (4) into $\theta3$ and $\theta3'$ in Equation (6), respectively, gives a relationship in Equation (7):

$$\frac{n1}{n2} \times \sin(\theta1 - \theta2) = \frac{n1'}{n2'} \times \sin(\theta1 - \theta2') \quad (7)$$

Thus, if the first and second prisms 31 and 35 are made from media having dispersion coefficients and refractive indices that satisfy the requirements of Equation (7), it is possible to realize a beam shaping prism 30 capable of compensating for chromatic aberration. For example, when the first and second prisms 31 and 35 are made from BaCED5 and E-FD2, available from HOYA Corporation, having refractive indices of n1(=1.6808) and n2(=1.68236), respectively, and an incident angle is 70°, the beam shaping ratio is 2.425 and transmittance of a beam at the incident surface 33 is about 99%. In this case, the beam shaping prism 30 thus constructed is able to compensate for chromatic aberration and send out the output beam oriented perpendicularly to an incident beam.

Meanwhile, the beam shaping prism 30 acts as a polarization beam splitter (PBS) as well by further including a third prism 39 made from the same medium as that of the second prism 35, that is, a medium having the same dispersion coefficient and refractive index as those of the second prism 35 and disposed adjacent to the inclined surface 37 of the second prism 35. In this case, the inclined surface 37 serves as a beam splitting surface where beams are split according to polarization.

In this way, when the beam shaping prism 30 further includes the third prism 39 that is made from the same medium as that of the second prism 35 and disposed adjacent to the inclined surface 37 of the second prism 35, the second and third prisms 35 and 39 serve as a PBS. Thus, the beam shaping prism 30 is able to compensate for chromatic aberration, perform beam shaping, and act as a PBS.

In this case, when constructed as a single block into which the beam shaping prism and the PBS are integrated, the beam shaping prism 30 allows an optical axis to be aligned perpendicularly, thereby facilitating alignment and assembling of optical elements as well as the manufacture of a base on which the elements are assembled.

Figure 9:
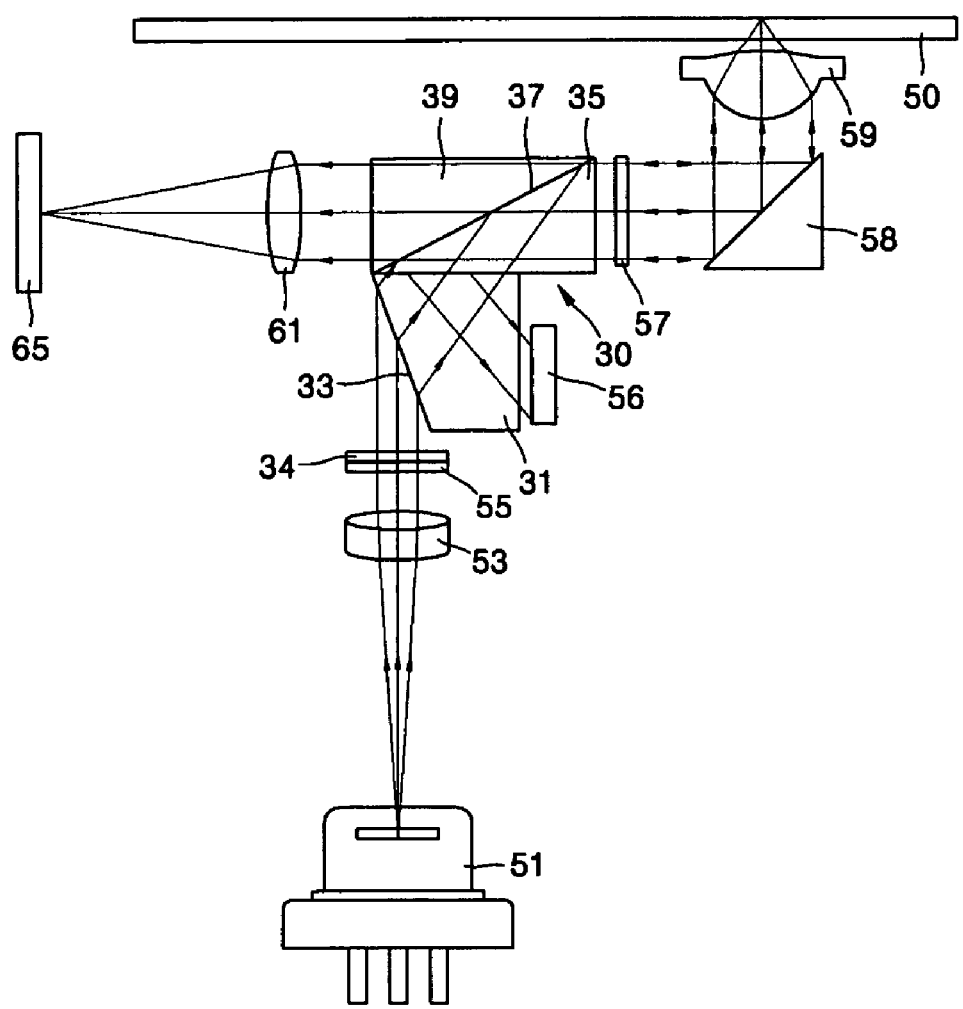
FIGS. 9 and 10 show optical pickups employing the beam shaping prisms of FIGS. 3 and 8 according to embodiments of the present invention, respectively.
Figure 10:
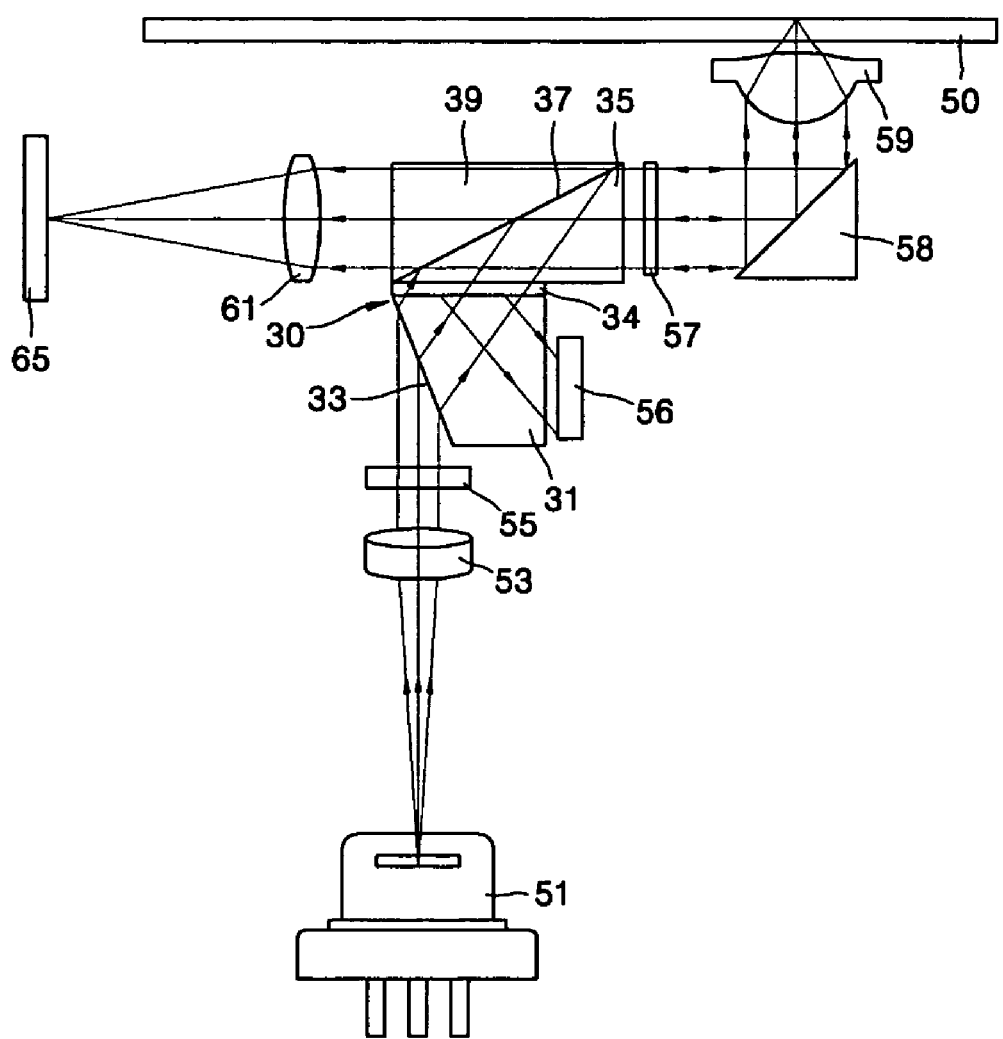

The beam shaping prism 30 can be employed in an optical pickup. FIGS. 9 and 10 schematically show optical pickups employing the beam shaping prisms 30 of FIGS. 3 and 8 according to embodiments of the present invention, respectively.

Referring to FIGS. 9 and 10, an optical pickup according to aspects of the present invention includes a light source 51, a collimating lens 53 that collimates a beam emitted by the light source 51, and a beam shaping prism 30 that shapes an elliptical beam that is emitted from the light source 51 and then passes through the collimating lens 53 into a circular beam, an objective lens 59 that focuses the incident beam to a spot on an information storage surface of an optical information storage medium, that is, an optical disc 50, and a photodetector 65 that receives a beam reflected from the information storage surface of the optical disc 50 for detection of a reproduced information signal and/or an error signal for servo control. In the beam shaping prism 30, like reference numerals in the drawings denote like elements, and thus their description will be omitted.

A laser diode that emits a laser beam with a predetermined wavelength is used as the light source 51. The light source 51 may be a single light source 51 or include a plurality of light sources 51 designed to emit at least one of a beam in an infrared wavelength suitable for a CD, e.g., 780 nm wavelength beam, a beam in a red wavelength region suitable for a DVD, e.g., 650 nm wavelength beam, and a beam in blue wavelength region suitable for an advanced optical disc (AOD) or a blue-ray disc (BD), e.g., 405 nm wavelength beam. Here, an AOD standard specifies a 405 nm wavelength light source, 0.65 numerical aperture (NA) objective lens, and 0.6 mm thickness recording medium. A BD standard specifies a 405 nm wavelength light source, 0.85 NA objective lens, and 0.1 mm thickness recording medium.

When the optical pickup according to aspects of the present invention is designed for compatibility among a plurality of optical discs using different formats and wavelengths, the light source 51 may be a TWIN-LD that emits two of the above three wavelength beams or a multi-wavelength light source that emits the above three wavelength beams. Alternatively, the optical pickup may include the light source 51 for emitting a first single wavelength beam and further include a separate light source for emitting a second beam of different wavelength than that from the light source 51, and optical elements arranged accordingly.

The collimating lens 53 collimates a divergent beam emitted by the light source to a parallel beam.

The optical pickup may further include a grating 55 that is disposed between the light source 51 and the beam shaping prism 30 and splits the beam emitted by the light source 51 into three or more beams. The grating 55 is used to detect a tracking error signal using either three-beam or differential push-pull (DPP) method or another method applying them. Thus, when a different method is used in detecting a tracking error signal, the grating 55 may not be required.

As shown in FIG. 9, the optical pickup may further include the half wave plate 34 that is disposed between the light source 51 and the beam shaping prism 30 and changes the polarization of a beam. Alternatively, as shown in FIG. 10, the half wave plate 34 is disposed between the first and second prisms 31 and 35 of the beam shaping prism 30.

The half wave plate 34 is used to reflect a beam having S-polarization from the inclined surface 37 of the second prism 35. To this end, the half wave plate 34 converts the polarization of the beam emitted from the light source 51 into orthogonal polarization. For example, when a P-polarized beam is emitted by the light source 51, the half wave plate 34 converts the P-polarized beam into an S-polarized beam. When the light source 51 is constructed to emit the S-polarized beam, the half wave plate 34 is not needed.

Although FIG. 9 has shown that the grating 55 and the half wave plate 34 are disposed between the collimating lens 53 and the beam shaping prism 30, the grating 55 and/or the half wave plate 34 may be positioned between the light source 51 and the collimating lens 53. Furthermore, while FIG. 9 has shown the grating 55 integrated with the half wave plate 34, they may be separated from each other.

As described in the foregoing, since the beam shaping prism 30 is designed to satisfy the requirements defined by Equation (1), the incident beam can be shaped into a form that can emerge perpendicularly to the direction of incidence. Furthermore, since the beam shaping prism 30 is designed in such a way as to satisfy both Equations (1) and (7), it cannot only shape a beam but also compensate for chromatic aberration.

The beam shaping prism 30 may compensate for chromatic aberration in the following cases.

For example, when the optical pickup according to the present invention is used in recording and/or reproducing BD or AOD so the light source 51 emits blue light (e.g., 405 nm wavelength light), a difference in light output power during transition between recording and reproducing modes will result in a change in wavelength. Even when the wavelength changes, the beam shaping prism 30 is able to compensate for chromatic aberration, thus allowing a shaped beam to emerge at a right angle to the direction of incidence. Here, for the blue light having about 405 nm wavelength, a wavelength change of about 1 to 2 nm occurs during transition between recording and reproducing modes.

When the optical pickup is used in recording and/or reproducing a CD and/or a DVD, a change in wavelength occurs due to a difference in light output power during transition between recording and reproducing modes. Also in this case, the beam shaping prism 30 may be designed to compensate for chromatic aberration, thereby allowing a shaped beam to emerge at right angles to the direction of incidence.

Furthermore, when the optical pickup includes, for example, a TWIN-LD as the light source 51 or the light source 51 and an additional light source each emitting different wavelength beams and other optical elements arranged accordingly, a beam emitted by the additional light source may be shaped by the beam shaping prism 30 in the same way as the beam emitted by the light source 51. In this case, the beam shaping prism 30 can compensate for chromatic aberration caused by a difference in wavelength, thus allowing the two beams having different wavelengths to emerge perpendicularly to the direction of incidence.

FIG. 9 shows the optical pickup employing the beam shaping prism 30 of FIG. 3 according to an embodiment of the present invention. As described above, the beam shaping prism 30 includes the first prism 31 having the incident surface 33 coated to increase the transmittance of S-polarized light and the second prism 35 having the inclined surface 37.

Alternatively, as shown in FIG. 10, the optical pickup includes the beam shaping prism 30 of FIG. 8 according to another embodiment of the present invention.

The beam shaping prism 30 includes the first prism 31 having the incident surface 33', the second prism 35 having the inclined surface 37, and the half wave plate 34 that is disposed between the first and second prisms 31 and 35 and changes the P-polarized beam into the S-polarized beam. In this case, the P-polarized beam is incident onto the incident surface 33' of the first prism 31. Since transmittance of the P-polarized beam is higher than that of the S-polarized beam, it is not necessary to coat the incident surface 33'. Also, when the incident surface 33' is coated to further increase the transmittance of the P-polarized beam, coating conditions may be relieved significantly compared to when the incident surface 33 is coated to increase the transmittance of the S-polarized beam.

As shown in FIGS. 3 and 8, the beam shaping prism 30 used in the optical pickup according to aspects of the present invention may further include a third prism 39 adjacent to the second prism 35. In this case, the beam shaping prism 30 also acts as a PBS, which eliminates the need for a separate PBS.

When the beam shaping prism 30 acts as a PBS, it is preferable to further include a quarter wave plate 57 that is disposed in an optical path between the beam shaping prism 30 and the objective lens 59 so that the polarization of the beam reflected from the optical disc 50 toward the beam shaping prism 30 is orthogonal to the polarization of the beam reflected from the inclined surface 37 of the second prism 35 toward the optical disc 50. In this case, when the latter is an S-polarized beam, a beam reflected from the optical disc into the second prism 35 has a P-polarization. Thus, the P-polarized beam is then directed through an interface between the second and third prisms 35 and 39, that is, the inclined surface 37.

The objective lens 59 creates a beam spot of an appropriate size on the information storage surface of the optical disc 50 and has a NA conforming to standards of the optical disc 50 and wavelength of light emitted from the light source 51. The photodetector 65 receives a beam that is focused onto the information storage surface of the optical disc 50 by the objective lens 59 and reflected off the same surface, and passes through the objective lens 59, the quarter wave plate 57, and the second and third prisms 35 and 39 of the beam shaping prism 30 for detection of a reproduced information signal and/or an error signal for servo control.

In FIGS. 9 and 10, reference numerals 58 and 61 denote a reflecting mirror that turns the direction of a beam from the beam shaping prism 30 at right angles toward the objective lens 59 and a sensing lens that condenses a beam transmitted through the beam shaping prism 30 toward the photodetector 65 to a beam spot of an appropriate size on the photodetector 65, respectively.

The sensing lens 61 may be an aspheric lens that can detect a focus error signal by an astigmatic method. The optical pickup may further include a monitoring photodetector 56 for monitoring light output power of the light source 51. As shown in FIGS. 9 and 10, the monitoring photodetector 56 may be disposed to receive some of the light reflected from an interface between the first and second prisms 31 and 35 of the beam shaping prism 30.

Propagation of a beam in an optical pickup having the beam shaping prism 30 will now be described.

A divergent beam emitted by the light source 51 is converted into a parallel beam by the collimating lens 53. When the collimated beam goes through the grating 55, it is split into three or more beams and converted to beams having orthogonal polarizations by the half wave plate 34. For example, if a P-polarized beam is emitted by the light source 51, it is converted to an S-polarized beam while passing through the half wave plate 34.

As shown in FIG. 9, the S-polarized beam incident on the beam shaping prism 30, is refracted and transmitted through the incident surface 33 of the first prism 31, reflected from the inclined surface 37, and emerges from the second prism 35 of the beam shaping prism 30. In this case, since the incident surface 33 is coated to increase the transmittance of the S-polarized beam, most of the incident beam is refracted and transmitted through the incident surface 33.

As shown in FIG. 10, instead of being disposed between the beam shaping prism 30 and the light source 51, the half wave plate 34 is disposed between the first and second prisms 31 and 35. When the P-polarized beam is incident onto the beam shaping prism 30, most of the incident P-polarized beam is refracted and transmitted through the incident surface 33' and converted into an S-polarized beam by the half wave plate 34. The S-polarized beam is reflected from the incident surface 37 of the second prism 35 and then emerges from the beam shaping prism 30.

When the beam emitted by the light source 51 passes through the beam shaping prism 30, chromatic aberration of the beam is compensated for and the beam is shaped to emerge perpendicularly to the direction of incidence.

The S-polarized beam emerging from the beam shaping prism 30 is converted into a first circularly polarized beam when it goes through the quarter wave plate 57 and reflected by the reflecting mirror 58 in such a way as to turn the path of the beam at right angles to the objective lens 59. The incident beam is focused to a spot on the information storage surface of the optical disc 50 by the objective lens 59. When the beam is reflected from the information storage surface of the optical disc 50, it is changed to a second circularly polarized beam that then passes through the objective lens 59 and is reflected by the reflecting mirror 58 into the quarter wave plate 57. The incident beam is converted to a P-polarized beam while passing through the quarter wave plate 57 and is incident onto the beam shaping prism 30. The incident P-polarized beam is transmitted through the interface between the second prism 35 and third prism 39, in particular, the inclined surface 37, and condensed onto the photodetector 65 by the sensing lens 61.

The beam shaping prism 30 employed in the optical pickup according to aspects of the present invention allows the path of a beam emitted from the light source 51 to be orthogonal to the path of a beam going toward the objective lens 59 and the photodetector 65. Thus, it is easy to arrange and assemble an optical pickup system. That is, since the beam shaping prism 30 allows the beam entering the beam shaping prism 30 to be perpendicular to the beam leaving the same, use of the beam shaping prism 30 makes it easy to control tolerances in the manufacture of the base where all the optical elements except the objective lens are assembled. Thus, the optical pickup including the beam shaping prism 30 can be applied as a compact optical pickup for mobile applications.

Figure 11:
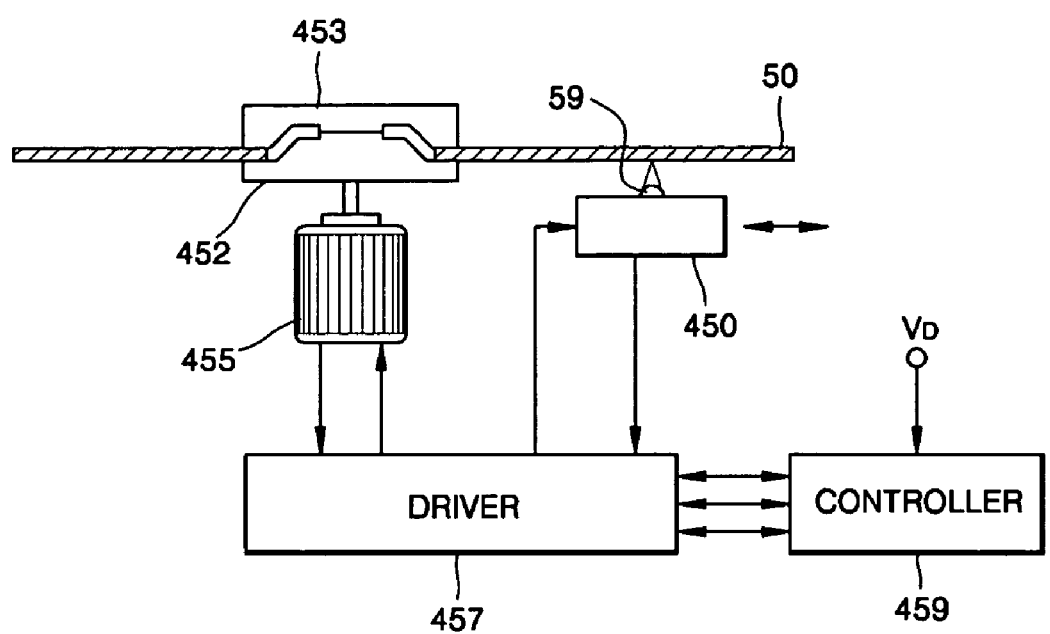
FIG. 11 is a schematic diagram showing the construction of an optical recording and/or reproducing apparatus including an optical pickup according to the present invention.

FIG. 11 schematically illustrates the construction of an optical recording and/or reproducing apparatus employing an optical pickup according to an embodiment of the present invention. Referring to FIG. 11, the optical recording and/or reproducing apparatus includes a spindle motor 455 that rotates the optical disc 50 that is the optical information storage medium, an optical pickup 450 that is installed movably along a radial direction of the optical disc 50 and reproduces information and/or records information from and/or to the optical disc 50, a driver 457 that drives the spindle motor 455 and the optical pickup 450, and a controller 459 that controls the focusing, tracking, and/or tilt servo of the optical pickup 450. Here, reference numerals 452 and 453 denote a turntable and a clamp for chucking the optical disc 50, respectively.

The optical pickup 450 has the beam shaping prism 30, and may be the optical pickup described with reference to FIG. 9 or 10. The objective lens 59 of the optical pickup 450 may be driven in focus, tracking and/or tilt directions by an actuator.

A beam reflected from the optical disc 50 is detected by the photodetector 65 mounted in the optical pickup 450 and photoelectrically converted into an electrical signal that is then input to the controller 459 through the driver 457. The driver 457 controls the rotating speed of the spindle motor 455, amplifies the input signal, and drives the optical pickup 450. The controller 459 sends focus servo, tracking servo, and/or tilt servo commands, which has been adjusted based on the signal received from the driver 457, back to the driver 457 so that the optical pickup 450 can perform focusing, tracking, and/or tilt servo control.

The beam shaping prism 30 allows an incident beam to be perpendicular to an exit beam, thereby facilitating optical arrangement and assembling of elements. Thus, the optical pickup 450 including the beam shaping prism 30 makes it easy to control tolerances in the manufacture of a base and to assemble and align the optical elements.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A beam shaping prism, comprising:
   a first prism having an incident surface; and
   a second prism having an inclined surface,
   wherein when an angle that the incident surface makes with an incident beam having an incident angle of $\theta 1$ is $\alpha 1$ and an angle that the inclined surface makes with a beam that passes from the first prism into the second prism and is reflected from the inclined surface is $\alpha 2$, the beam shaping prism satisfies a first equation and allows the beam to emerge perpendicularly to the incident beam:

$$\theta 1 = \text{incident angle}$$
$$\theta 2 = \sin^{-1}\left(\frac{\sin\theta 1}{n1}\right)$$
$$\theta 3 = \theta 1 - \theta 2$$
$$\theta 4 = \sin^{-1}\left(\frac{n1 \times \sin\theta 3}{n2}\right)$$
$$\theta 5 = \frac{90° + \theta 4}{2}$$
$$\alpha 1 = 90° - \theta 1$$
$$\alpha 2 = \theta 5 - \theta 4 = \frac{90° - \theta 4}{2}$$

where n1 and n2 are refractive indices of the first and second prisms, respectively, $\theta 2$ is a refraction angle of a first beam that is refracted through the incident surface of the first prism, $\theta 3$ is an incident angle of a second beam that passes from the first prism into the second prism, $\theta 4$ is a refraction angle of a third beam refracted through the first prism into the second prism, and $\theta 5$ is an angle that the third beam traveling through the second prism is incident on the inclined surface of the second prism.

2. The beam shaping prism of claim 1, wherein a beam shaping ratio M that is a ratio of a width of the beam to a width of the incident beam is defined by a second equation:

$$M = \frac{\cos\theta 2 \cos\theta 4}{\cos\theta 1 \cos\theta 3}$$

3. The beam shaping prism of claim 1, wherein the first and second prisms are made from media having refractive indices and dispersion coefficients that satisfy a third equation in order to compensate for chromatic aberration:

$$\frac{n1}{n2} \times \sin(\theta 1 - \theta 2) = \frac{n1'}{n2'} \times \sin(\theta 1 - \theta 2')$$

where n1', n2', and θ2' denote refractive indices and angles corresponding to n1, n2, and θ2, respectively, when a wavelength of the incident beam changes.

4. The beam shaping prism of claim 3, wherein the incident surface is coated to increase transmittance of an S-polarized beam.

5. The beam shaping prism of claim 3, further comprising a half wave plate that is disposed between the first and second prisms to convert a polarization of the incident beam into orthogonal polarization.

6. The beam shaping prism of claim 1, wherein the incident surface is coated to increase transmittance of an S-polarized beam.

7. The beam shaping prism of claim 1, further comprising a half wave plate disposed between the first and second prisms to convert a polarization of the incident beam into orthogonal polarization.

8. The beam shaping prism of claim 7, further comprising a third prism disposed adjacent to the inclined surface of the second prism to perform polarization beam splitting.

9. The beam shaping prism of claim 1, further comprising a third prism that is disposed adjacent to the inclined surface of the second prism and thus the beam shaping prism acts as a polarization beam splitter.

10. An optical pickup including a beam shaping prism and which shapes a first beam emitted by a light source, focuses the shaped first beam onto an optical information storage medium by an objective lens, and receives a reflected beam from the optical information storage medium by a photodetector, wherein the beam shaping prism, comprises:

a first prism having an incident surface and a second prism having a surface inclined to an interface with the first prism, and wherein when an angle that the incident surface makes with the first beam having an incident angle of θ1 is α1 and an angle that the inclined surface makes with an exit beam that passes from the first prism into the second prism and is reflected from the inclined surface is α2, the beam shaping prism satisfies a first equation and allows the exit beam to emerge perpendicularly to the first beam:

$$\theta 1 = \text{incident angle}$$

$$\theta 2 = \sin^{-1}\left(\frac{\sin\theta 1}{n1}\right)$$

$$\theta 3 = \theta 1 - \theta 2$$

$$\theta 4 = \sin^{-1}\left(\frac{n1 \times \sin\theta 3}{n2}\right)$$

-continued $$\theta 5 = \frac{90° + \theta 4}{2}$$

$$\alpha 1 = 90° - \theta 1$$

$$\alpha 2 = \theta 5 - \theta 4 = \frac{90° - \theta 4}{2}$$

where n1 and n2 are refractive indices of the first and second prisms, respectively, θ2 is a refraction angle of a second beam that is the first beam that is refracted through the incident surface of the first prism, θ3 is an incident angle of a third beam that is the second beam that passes from the first prism into the second prism, θ4 is a refraction angle of a fourth beam that is the third beam that is refracted through the first prism into the second prism, and θ5 is an angle that the fourth beam traveling through the second prism is incident on the inclined surface of the second prism.

11. The optical pickup of claim 10, wherein the beam shaping prism is designed such that a beam shaping ratio M that is a ratio of a width of the exit beam to a width of the incident beam satisfies a second equation:

$$M = \frac{\cos\theta 2 \cos\theta 4}{\cos\theta 1 \cos\theta 3}$$

12. The optical pickup of claim 10, wherein the first and second prisms of the beam shaping prism are made from media having refractive indices and dispersion coefficients that satisfy a third equation in order to compensate for chromatic aberration:

$$\frac{n1}{n2} \times \sin(\theta 1 - \theta 2) = \frac{n1'}{n2'} \times \sin(\theta 1 - \theta 2')$$

where n1', n2', and θ2' denote refractive indices and angles corresponding to n1, n2, and θ2, respectively, when a wavelength of the first beam changes.

13. The optical pickup of claim 12, wherein the incident surface in the beam shaping prism is coated to increase transmittance of an S-polarized beam.

14. The optical pickup of claim 13, further comprising a half wave plate disposed between the beam shaping prism and the light source to convert a polarization of the incident beam into orthogonal polarization.

15. The optical pickup of claim 12, wherein the beam shaping prism further comprises a half wave plate disposed between the first and second prisms to convert a polarization of the first beam into orthogonal polarization.

16. The optical pickup of claim 10, wherein the incident surface in the beam shaping prism is coated to increase transmittance of an S-polarized beam.

17. The optical pickup of claim 16, further comprising a half wave plate disposed between the beam shaping prism and the light source to convert a polarization of the first beam into orthogonal polarization.

18. The optical pickup of claim 10, wherein the beam shaping prism further comprises a half wave plate disposed between the first and second prisms to convert a polarization of the first beam into orthogonal polarization.

19. The optical pickup of claim 18, wherein the beam shaping prism further comprises a third prism disposed adjacent to the inclined surface of the second prism to perform polarization beam splitting.

20. The optical pickup of claim 19, further comprising a quarter wave plate disposed between the beam shaping prism and the objective lens to change the polarization of the reflected beam.

21. The optical pickup of claim 10, wherein the beam shaping prism further comprises a third prism disposed adjacent to the inclined surface of the second prism to perform polarization beam splitting.

22. The optical pickup of claim 21, further comprising a quarter wave plate disposed between the beam shaping prism and the objective lens to change the polarization of the reflected beam.

23. A beam shaping prism, comprising:
a first prism having an incident surface to receive an incident elliptical light beam at an acute incident angle; and
a second prism adjacent the first prism having an inclined surface to reflect the incident elliptical light beam after transmittance through the first prism and a portion of the second prism,
wherein a first surface of the first prism and a second surface of the second prism forming an interface between the first prism and the second prism are each at a right angle to the incident elliptical beam and a circular exit beam is emitted from the second prism parallel to the interface after being reflected from the inclined surface.

24. The beam shaping prism of claim 23, further comprising:
a half wave plate disposed between the first and second prisms to convert the incident elliptical beam into an orthogonal polarization.

25. The beam shaping prism of claim 24, wherein the first and second prisms are comprised of materials having different refractive indices and dispersion coefficients such that chromatic aberrations are corrected in the circular exit beam.

26. The beam shaping prism of claim 25, further comprising:
a third prism disposed adjacent to the inclined surface of the second prism such that a beam entering the second prism parallel and in an opposite direction to the circular exit beam passes through the inclined surface and into the third prism to perform polarization beam splitting.

27. The beam shaping prism of claim 23, wherein the first and second prisms are comprised of materials having different refractive indices and dispersion coefficients such that chromatic aberrations are corrected in the circular exit beam.

28. The beam shaping prism of claim 27, further comprising:
a third prism comprised of the same material as the second prism and disposed adjacent to the inclined surface of the second prism such that a beam entering the second prism parallel and in an opposite direction to the circular exit beam passes through the inclined surface and into the third prism to perform polarization beam splitting.

29. The beam shaping prism of claim 23, wherein the incident surface is coated to improve transmittance of the incident elliptical beam to at least 99%.

30. The beam shaping prism of claim 29, wherein the acute incident angle is between 35 degrees and 70 degrees.

31. The beam shaping prism of claim 23, wherein the incident surface is coated to achieve a transmittance of the incident elliptical beam to at least 90%.

32. The beam shaping prism of claim 31, wherein the incident elliptical beam is an S-polarized beam.

33. The beam shaping prism of claim 23, wherein the incident elliptical beam is at least one of a 405 nm wavelength beam, a 650 nm wavelength beam or a 780 nm wavelength beam.

34. An optical pickup, comprising:
a light source emitting a beam;
an objective lens directing the beam to a surface of an optical storage medium and directing a reflected beam from the surface of the optical storage medium;
a beam shaping prism disposed between the light source and the objective lens comprising:
a first prism having an incident surface to receive the beam at an acute incident angle; and
a second prism adjacent the first prism having an inclined surface to reflect the beam after transmittance through the first prism and a portion of the second prism;
a sensing lens which condenses the reflected beam transmitted through the beam shaping prism; and
a photodetector which senses the condensed reflected beam from the sensing lens,
wherein a first surface of the first prism and a second surface of the second prism forming an interface between the first prism and the second prism are each at a right angle to the incident elliptical beam and a circular exit beam is emitted from the second prism parallel to the interface after being reflected from the inclined surface.

35. The optical pickup of claim 34, further comprising:
a half wave plate disposed between the light source and the beam shaping prism to convert the incident elliptical beam into an orthogonal polarization.

36. The optical pickup of claim 34, wherein the beam shaping prism further comprises a half wave plate disposed between the first and second prisms to convert the incident elliptical beam into an orthogonal polarization.

37. The optical pickup of claim 34, wherein the light source emits the beam at a wavelength equal to at least one of a 405 nm wavelength beam, a 650 nm wavelength beam or a 780 nm wavelength beam.

38. The optical pickup of claim 34, further comprising:
a polarization changer disposed adjacent the light source to change the polarization of the beam to an S-polarized beam.

39. The optical pickup of claim 34, wherein the first prism comprises a first material having a different dispersion coefficient and refractive indices than a second material comprising the second prism.

40. The optical pickup of claim 39, wherein the beam shaping prism further comprises a third prism disposed adjacent to the inclined surface of the second prism such that the reflected beam entering the second prism parallel and in an opposite direction to the beam passes through the inclined surface and into the third prism to perform polarization beam splitting.

41. The optical pickup of claim 40, wherein the third prism is comprised of the second material.

* * * * *